US011249042B2

(12) United States Patent
MacPherson et al.

(10) Patent No.: US 11,249,042 B2
(45) Date of Patent: Feb. 15, 2022

(54) DIAMOND BASED ELECTROCHEMICAL SENSORS

(71) Applicant: ELEMENT SIX TECHNOLOGIES LIMITED, Didcot (GB)

(72) Inventors: Julie Victoria MacPherson, Coventry (GB); Zoe Joanna Ayres, Coventry (GB); Mark Edward Newton, Coventry (GB)

(73) Assignee: Element Six Technologies Limited, Didcot (GB)

( * ) Notice: Subject to any disclaimer, the term of this patent is extended or adjusted under 35 U.S.C. 154(b) by 0 days.

(21) Appl. No.: 16/470,575

(22) PCT Filed: Jan. 30, 2018

(86) PCT No.: PCT/EP2018/052252
§ 371 (c)(1),
(2) Date: Jun. 18, 2019

(87) PCT Pub. No.: WO2018/141738
PCT Pub. Date: Aug. 9, 2018

(65) Prior Publication Data
US 2019/0339220 A1 Nov. 7, 2019

(30) Foreign Application Priority Data
Jan. 31, 2017 (GB) ...................... 1701529

(51) Int. Cl.
*G01N 27/30* (2006.01)
*G01N 27/416* (2006.01)
*G01N 27/48* (2006.01)

(52) U.S. Cl.
CPC ....... *G01N 27/308* (2013.01); *G01N 27/4167* (2013.01); *G01N 27/48* (2013.01)

(58) Field of Classification Search
CPC .. G01N 27/308; G01N 27/4167; G01N 27/48; G01N 27/4168; G01N 27/302; G01N 27/327; G01N 27/4075
See application file for complete search history.

(56) References Cited

U.S. PATENT DOCUMENTS 4,629,373 A * 12/1986 Hall ...................... B23B 27/146
175/434
5,223,117 A 6/1993 Wrighton et al.
(Continued)

FOREIGN PATENT DOCUMENTS

GB 2461555 A 1/2010
WO WO-2007020410 A1 * 2/2007 ........... G01N 27/308
(Continued)

OTHER PUBLICATIONS

Foord et al. (JS Foord, W Hao, S Hurst, Studies of the chemical functionalization of diamond electrodes, Diamond and related materials 16 (2007) 877-880) (Year: 2007).*
(Continued)

*Primary Examiner* — Joshua L Allen
(74) *Attorney, Agent, or Firm* — Kilpatrick Townsend & Stockton LLP

(57) ABSTRACT

An electrochemical sensor comprising a boron doped diamond electrode formed of boron doped diamond material, an array of non-diamond carbon sites disposed on a sensing surface of the boron doped diamond electrode, electrochemically active non-diamond carbon surface groups bonded to the non-diamond carbon sites for generating a first redox peak at a first potential associated with dissolved oxygen and a second redox peak at a second potential which changes with pH, the first and second redox peaks being separated such that they do not overlap, an electrical controller configured to scan the boron doped diamond electrode over a potential range to generate at least said first
(Continued)

250 μm redox peak, and a processor configured to give an electrochemical reading based on one or both of a position and an intensity of said first redox peak.

9 Claims, 7 Drawing Sheets

(56) References Cited

U.S. PATENT DOCUMENTS

| | | | | |
|---|---|---|---|---|
| 2007/0267291 A1* | 11/2007 | Hall | ............. | G01N 27/308 204/412 |
| 2010/0006450 A1* | 1/2010 | Whitehead | ............. | C02F 1/46109 205/742 |
| 2011/0308942 A1* | 12/2011 | Liu | ............. | G01N 27/27 204/400 |
| 2012/0037505 A1* | 2/2012 | Pickles | ............. | G01N 27/308 204/400 |
| 2012/0286289 A1* | 11/2012 | Dipalo | ............. | G01N 27/414 257/77 |
| 2013/0313128 A1* | 11/2013 | Fielden | ............. | G01N 27/308 205/780 |
| 2013/0327640 A1* | 12/2013 | Mollart | ............. | G01N 27/308 204/294 |
| 2014/0069811 A1* | 3/2014 | Newton | ............. | G01N 27/48 204/406 |
| 2015/0014164 A1* | 1/2015 | Lee | ............. | G01N 27/302 204/412 |
| 2015/0060267 A1* | 3/2015 | Mollart | ............. | C02F 1/46109 204/294 |
| 2015/0102266 A1* | 4/2015 | Bitziou | ............. | G01N 27/308 252/502 |
| 2016/0282293 A1* | 9/2016 | Stacey | ............. | G01N 27/308 |
| 2018/0224397 A1* | 8/2018 | Kroll | ............. | G01N 27/4167 |
| 2018/0228396 A1* | 8/2018 | Okubo | ............. | A61B 5/1473 |

FOREIGN PATENT DOCUMENTS

| | | |
|---|---|---|
| WO | 2010029277 A1 | 3/2010 |
| WO | 2012083258 A2 | 6/2012 |
| WO | 2016083263 A1 | 6/2012 |
| WO | 2013135783 A1 | 9/2013 |
| WO | WO-2015000769 A1 * | 1/2015 ........... G01N 27/302 |
| WO | 2015079257 A2 | 6/2015 |

OTHER PUBLICATIONS

Kahlert (H Kahlert, Functionalized carbon electrodes for pH determination, J. Solid State Electrochem. 12 (2008) 1255-1266) (Year: 2008).*
Sarapuu et al. (A Sarapuu, K Helstein, DJ Schiffrin, K Tammeveski, Kinetics of oxygen reduction on quinone-modified HOPG and BDD electrodes in alkaline solution, Electrochemical and Solid-State Letters 8 (2005) E30-E33) (Year: 2005).*
Luong et al. (JHT Luong, KB Male, JD Glennon, Boron-doped diamond electrode; synthesis, characterization, functionalization and analytical applications, Analyst 134 (2009) 1965-1979) (Year: 2009).*
Sljukic et al. (B Sljukic, CE Banks, RG Compton, An overview of the electrochemical reduction of oxygen at carbon-based modified electrodes, J. Iranian Chemical Society 2(1) (2005) 1-25) (Year: 2005).*
United Kingdom Patent Application No. GB1701529.8, Combined Search and Examination Report dated Jun. 16, 2017, 6 pages.
United Kingdom Patent Application No. GB1801468.8, Combined Search and Examination Report dated Jul. 3, 2018, 6 pages.
International Patent Application No. PCT/EP2018/052252, International Search Report and Written Opinion dated May 22, 2018, 14 pages.

* cited by examiner

250 μm

DIAMOND BASED ELECTROCHEMICAL SENSORS

FIELD OF INVENTION

The present invention relates to diamond based electrochemical sensors. Certain embodiments relate to medical devices comprising such electrochemical sensors. Other embodiments can be used for a variety of industrial and environmental electrochemical sensing applications. Sensors according to the present invention are particularly useful where measurement of pH and/or dissolved oxygen concentration is required, optionally in combination with temperature measurement.

BACKGROUND OF INVENTION

It has already been proposed in the prior art to provide diamond based sensors for measuring the electrochemical properties of solutions. Diamond can be doped with boron to form semi-conductive or metal like conductive material for use as an electrode. Electrically conductive diamond is also hard, inert, and has a very wide potential window making it a very desirable material for use as a sensing electrode for an electrochemical cell, particularly in harsh chemical, physical, and/or thermal environments which would degrade other types of electrochemical sensor (e.g. metal based sensors) or in medical applications which require biocompatibility.

WO2013/135783 disclosed optimized boron doped diamond (BDD) materials for electrochemical sensing applications which have a high boron content and a low sp2 carbon content which can be used to form boron doped diamond electrodes which have a wide solvent window, a high degree of reversibility, and a low capacitance. WO2013/135783 describes that introducing high concentrations of boron into the diamond lattice during synthesis in order to reach the desired levels of electrical conductivity also results in a significant amount of sp2 carbon (also referred to as Non-Diamond Carbon or NDC) being introduced into the diamond material. It is described that high sp2 carbon content or non-diamond carbon results in background currents which can interfere with electrochemical sensing of target species, particularly at very low target species concentration levels. Synthesis methods and product materials are described to provide optimized boron doped diamond materials for electrochemical sensing applications which have a high boron content and a low sp2 carbon content. Such a material has a wide solvent window, low background currents, high signal resolution, low capacitance, and a high degree of reversibility towards outer sphere redox species.

While such a material has been shown to be excellent for sensing certain target species as well as measuring parameters such as solution conductivity, the optimized diamond material is electrochemically inert and incapable of generating a signal for certain target species in solution. In this regard, it is known that the surface of a boron doped diamond electrode may be functionalized to sense certain species in a solution adjacent the electrode. For example, a boron doped diamond electrode can be functionalized with metal nanoparticles as described in WO2010/029277 to sense target species such as oxygen. Alternatively, WO2015/079257 describes a boron doped diamond electrochemical sensor functionalized which non-diamond carbon (sp2 carbon) for detecting and measuring free chlorine in solution. It is described that within a sensing system based on reductive amperometry there is the possibility of interference due to the presence of dissolved oxygen within the sensing solution or in a supporting electrolyte/buffer if used. WO2015/079257 teaches that there is a desire to reduce this interference by dissolved oxygen. It is described in WO2015/079257 that boron doped diamond is less prone to interference from the presence of dissolved oxygen in the sample. It is further described in WO2015/079257 that when using boron doped diamond electrodes which are functionalized with metal nanoparticles as described in WO2010/029277 the response from oxygen swamps the chlorine response required in the sensor apparatus under consideration. WO2015079257 describes that the chlorine measurement is not swamped by such an oxygen response when using an sp2 functionalized boron doped diamond electrode. Furthermore, WO2015079257 described a sensor which is configured to measure two distinct chlorine species, a cathodic measurement of the HOCl species and an anodic measurement of the OCl⁻ species. It is indicated that the purpose of making two measurements is to overcome pH sensitivity that is inherent in the speciation chemistry of the sample under observation, where deliberate fixing of the pH through buffering is either undesirable, infeasible, or has only partial effectiveness. In summary, WO2015/079257 thus seeks to provide a free-chlorine sensor which is insensitive to pH and dissolved oxygen.

WO2016/083263 also describes an sp2 functionalized boron doped diamond electrochemical sensor. Unlike the sensor described in WO2015/079257 which is specifically configured to be independent of pH, the sensor described in WO2016/083263 is configured for measuring pH. The electrochemical sensor comprises a boron doped diamond electrode formed of boron doped diamond material with an array of non-diamond carbon sites disposed on a sensing surface of the boron doped diamond electrode. Electrochemically active non-diamond carbon surface groups are bonded to the non-diamond carbon sites for generating a redox peak with a potential which changes with pH. The electrochemical sensor is provided with a processor which is configured to give a pH reading based on the position of the redox peak of the electrochemically active surface groups. For example, boron doped diamond electrodes can be treated by laser ablation to form an array of non-diamond carbon sites which are functionalized with electrochemically active surface groups which have such a functionality. It is described that such a sensor is also capable of measuring chlorine species. It is also described that sufficient electrochemically active surface groups can be provided at the sensing surface of the boron doped diamond electrode to generate the pH sensitive redox peak while providing sufficiently low amounts of non-diamond carbon that oxygen is not reduced at the position where the pH sensitive redox peak occurs. That is, WO2016/083263 describes a sensor which can measure pH and chlorine species while being insensitive to dissolved oxygen.

In summary, the prior art teaches the use of a metal nanoparticle functionalized boron doped diamond sensor for measuring dissolved oxygen or a non-diamond carbon sp2 functionalized boron doped diamond sensor for measuring chlorine species or pH without interference from dissolved oxygen.

SUMMARY OF INVENTION

In contrast to the above, the present invention is concerned with providing a non-diamond carbon (sp2) functionalized boron doped diamond sensor which is configured to measure a redox peak associated which dissolved oxygen.

The sensor utilizes a boron doped diamond electrode with an array of non-diamond carbon sites which is the same or similar to that described in WO2016/083263. However, the sensor has an electrical controller which is configured to scan the boron doped diamond electrode over a potential range to generate the dissolved oxygen redox peak and a processor which is configured to give an electrochemical reading based on one or both of a position and an intensity of the dissolved oxygen redox peak.

The measurement can be utilized in two different ways. Measurement of the intensity (i.e. current magnitude) of the dissolved oxygen peak can be utilized to determine the concentration of the dissolved oxygen in solution. Alternatively, or additionally, measurement of the potential of the dissolved oxygen peak can be used as an internal reference such that pH can be measured without requiring a standard reference electrode. In particular, it has been found that the potential difference between the dissolved oxygen redox peak and the pH sensitive redox peak of non-diamond carbon species on the surface of boron doped diamond is proportional to the pH of the solution. Furthermore, by utilizing this potential difference the pH measurement is independent of a shift in the peak positions due to electrode fouling and/or changes in solution conditions. As such, the requirement for a standard reference electrode is negated. Further still, this approach is advantageous in that standard reference electrodes themselves can drift over time due to degradation. The present approach is also essential in applications where a standard electrode cannot be utilized, e.g. in vivo medical applications or long time scale environmental monitoring.

Thus, according to a first aspect of the present invention there is provided an electrochemical sensor comprising:
- a boron doped diamond electrode formed of boron doped diamond material;
- an array of non-diamond carbon sites disposed on a sensing surface of the boron doped diamond electrode;
- electrochemically active non-diamond carbon surface groups bonded to the non-diamond carbon sites for generating a first redox peak at a first potential associated with dissolved oxygen and a second redox peak at a second potential which changes with pH, the first and second redox peaks being separated such that they do not overlap;
- an electrical controller configured to scan the boron doped diamond electrode over a potential range to generate at least said first redox peak; and
- a processor configured to give an electrochemical reading based on one or both of a position and an intensity of said first redox peak.

In one configuration the processor is configured to give a dissolved oxygen concentration reading based on the intensity of the first redox peak. Additionally, or alternatively, the electrical controller is configured to scan the boron doped diamond electrode over a potential range to generate both the first and second redox peaks, and the processor is configured to give a pH reading based on a difference in potential between the first and second redox peaks, the first redox peak associated with dissolved oxygen functioning as an internal reference such that pH is determined without requiring a standard reference electrode. In this regard, it should be noted that when scanning over both the pH redox peak and the oxygen redox peak one would normally scan in a direction such that the pH redox peak is scanned prior to the oxygen redox peak. As such, the terms "first" and "second" in relation to the redox peaks are not intended to indicate a temporal order.

Unlike WO2015/079257 and WO2016/083263 which are specifically adapted to scan a potential range away from the dissolved oxygen redox peak, embodiments of the present invention utilize the oxygen peak to measure both dissolved oxygen and pH. Optionally, a temperature sensor is also mounted to the boron doped diamond electrode, e.g. a thermocouple on a rear surface of the boron doped diamond electrode. The exceptionally thermal conductivity of the diamond material allows for an accurate and responsive temperature measurement of fluid in contact with the boron doped diamond electrode. According to a further aspect of the present invention the electrochemical sensor as described herein is used for measuring characteristics of a fluid from a human or animal body. Such characteristics include one or more of: pH; oxygen concentration; and temperature.

In this regard, it has been noted that dissolved oxygen, pH and temperature are three fundamental measurements utilized in medical procedures. Unlike current blood gas analysis techniques, the present invention enables almost instant measurement and real-time monitoring of these fundamental medical diagnostics. Accordingly, for such medical applications the boron doped diamond electrode can be mounted on a medical device such as an invasive device which, in whole or in part, penetrates inside a human or animal body, either through a body orifice or through the surface of the body (e.g. an intravenous device, a needle, a scalpel blade, a catheter, or the like). Since the doped diamond electrode is biocompatible it can be mounted on the invasive device such that in use the boron doped diamond electrode is located within the body to take in vivo electrochemical readings.

Further still, since embodiments of the present invention use the dissolved oxygen redox peak as an internal reference for pH measurement without requiring a standard reference electrode, another part of the invasive device can be connected to the electrical controller and functions as a counter or pseudo reference electrode (e.g. a metallic or boron doped diamond component of the device). This is important as standard reference electrodes are not biocompatible and are subject to drift and fouling.

The aforementioned advantageous features are also applicable in a wide range of industrial and environmental electrochemical sensing applications where monitoring of pH, dissolved oxygen concentration, and temperature are important. According to a second aspect, there is provided a use of the electrochemical sensor as described above in the first aspect for measuring characteristics of a fluid from a human or animal body. Exemplary characteristics are optionally selected from any of: pH; oxygen concentration; and temperature.

BRIEF DESCRIPTION OF THE DRAWINGS

For a better understanding of the present invention and to show how the same may be carried into effect, embodiments of the present invention will now be described by way of example only with reference to the accompanying drawings, in which.

DETAILED DESCRIPTION

Figure 1:
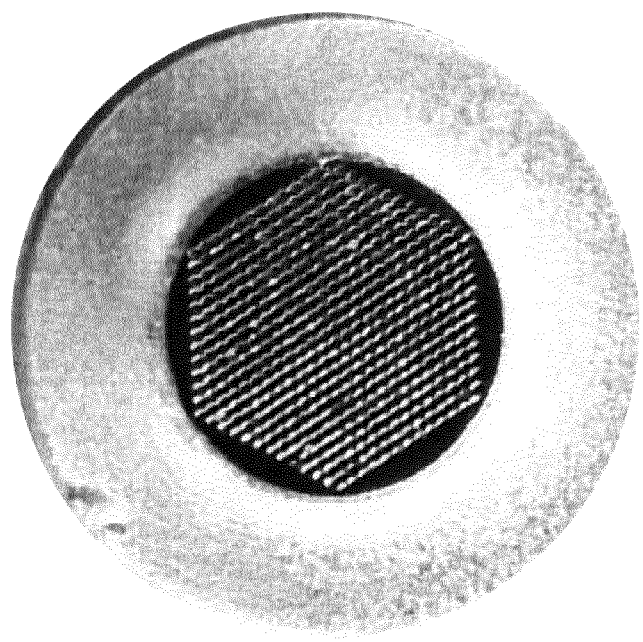
FIG. 1 shows sp2 functionalized boron doped diamond electrode fabricated via laser patterning.

Small physiological changes in pH, $O_2$ and temperature in blood and tissue provide the ultimate early warning system for trauma at the cellular level. By accessing this information at the roadside informed clinical decisions can be made to safeguard patient health. Unfortunately, in vivo continuous monitoring is extremely challenging due to the complexity of the matrices involved as well as electrodes suffering from drift and biocompatibility issues. Here, boron doped diamond (BDD) electrochemical sensors are described for the real-time, simultaneous detection of pH, $O_2$ and temperature, optionally in-vivo. To achieve this, BDD is sensitised to both pH and oxygen using a graphitisation process, whilst the high thermal conductivity of diamond is used advantageously to make accurate temperature measurements. Furthermore, the design of the sensor negates the need for a conventional reference electrode. In this regard, the main drawback for in vivo electrochemical monitoring is due to drift which can be negated by utilising the oxygen signature as an internal reference. The sensor is thus intrinsically biocompatible, made entirely of carbon. The whole sensor package can be integrated into a standard hypodermic needle, enabling access to subdermal blood and tissue, combined with a miniaturised circuit capable of conducting potentiostatic operations, in order to provide real-time feedback. This novel technology is expected to revolutionise treatment of patients not only at the roadside (aiding the ambulance service) but also as part of routine patient monitoring in hospitals. The sensor is also expected to find broad applications in disease diagnostics and monitoring, brain activity monitoring, drug development and many other areas. For example, it is well documented that the extracellular microenvironment around tumour tissue is acidic and often has an elevated temperature, yet a method to effectively evaluate this in vivo does not currently exist. This provides further scope for the BDD sensor to be used for cancer diagnostics and effective tumour removal.

A portable boron doped diamond sensor can thus be provided for clinical use, capable of continuously monitoring pH, $O_2$ and temperature. Assessment of this fundamental information at the roadside offers the opportunity for real-time clinical intervention in order to inform on the need for surgery and potentially reduce loss of life. The design of the sensor is such that issues associated with conventional reference electrode are negated enabling continuous measurement. As the very first portable and continuous electrochemical sensor for a wide range of information (pH, $O_2$ and temperature) it will also allow scientists to obtain new detailed insights into physiological and pathological scenarios in vivo and hence help develop effective disease treatments.

The fully-functioning, healthy human body maintains homeostasis which is reflected in the tightly regulated pH in blood (ranging from 7.35 to 7.45) and tissue (ca. 7.40), as well as $O_2$ concentration and temperature. Deviation from standard conditions can be life threatening, indicating trauma, including loss of oxygen to limbs, as well as serious diseases. For this reason, regular arterial blood gas monitoring is essential for critically ill patients. The crucial importance of measuring pH and $O_2$ is reflected by the fact that commercial blood gas analysers (BGAs) are used routinely in hospitals. Here blood samples are removed from the patient, typically at most every hour, for analysis in the BGA. Unfortunately, the intermittent nature of the ex-situ measurement (ex-situ) provides a limited picture of a continuously changing environment, with short term trends often being overlooked, impacting patient health. The offline nature of the analysis also provides many opportunities for errors to occur including inappropriate sample storage, reduction on $O_2$ in blood samples due to leukocyte $O_2$ consumption and the presence of air bubbles in samples leading to erroneous results.

Research has thus focused on developing continuous, in vivo monitoring with the aim to assist in patient management and patient safety. To this end, continuous BGA systems have been explored but unfortunately a single BGA instrument is bulky and costs thousands of pounds. Electrochemistry offers a cheap, simple and portable alternative. Whilst the glass pH electrode has been successfully miniaturised, the technology is not suitable for intravenous measurements due to its fragility. Furthermore, classical reference electrodes are subject to fouling and drift to the complex biological matrices encountered in-vivo making long term monitoring problematic. They also suffer with biocompatibility issues. Furthermore, it is considered that if this fundamental information could be accessed at the roadside in addition to at the bedside, clinical assessment and appropriate intervention could be conducted and potentially prevent a deleterious event, with prehospital care known to dramatically impact the efficiency of treatment. This is not possible with existing technologies.

One embodiment of the present invention provides the first ever portable electrochemical sensor that can: (a) simultaneously assess the pH, $O_2$ content and temperature of human blood and tissue in real-time; which is (b) fully biocompatible due to being made solely of carbon; (c) contains a biocompatible internal reference; and (d) can be fully integrated into a hypodermic needle for in vivo measurements.

Advantages of the sensor as described herein include the following:

1. Diamond is biocompatible being made entirely of carbon and also shows reduced fouling in complex matrices compared to other electrode materials.

2. The BDD can be functionalised using laser ablation to make an inherently stable sp2 carbon layer capable of sensing both pH and $O_2$.

3. The inherently high thermal conductivity of diamond means that temperature can be accurately probed, using a thermocouple placed on the back side of the electrode without having to expose the temperature sensor to the biological environment.

4. The temporal resolution of the technique is seconds enabling, for example, doctors to administer drugs and see in real-time the effect of the drugs on a patient.

5. Design of the laser ablation pattern can be altered to eliminate uncontrolled mass transport effects and optimise sp2 carbon content for simultaneous detection of pH and $O_2$.

BDD in its purest form offers a range of properties extremely attractive for electroanalysis, i.e. very low background currents, high thermal conductivity, wide solvent window, extremely stable surface leading to high reproducibility, reduced biofouling, resistant to chemical attack, mechanically stable. All these properties arise from the sp3 bonded nature of the carbon structure leading to an electrocatalytically inactive surface. However, many electroactive species require some form of adsorption prior to electron transfer (ET), meaning on the pure BDD surface they show either very slow electron transfer (ET) kinetics or no response at all within the solvent window. To increase ET rates, metal nanoparticles are often placed on the electrode surface. However, for biomedical related work where the aim is to place the sensor in direct contact with fluid within the body, for potentially long periods of time, this is not appropriate, and is also the reason why classical electrode materials are not of use for in-vivo monitoring. In contrast, sp2 carbon, which is biocompatible, is more catalytically active than sp3 carbon, especially when introduced in a form where a high density of binding sites are exposed e.g. through the introduction of C=O, COOH groups etc. For use in the body, one approach is to incorporate sp2 carbon into the BDD surface structure. However, it is important to do this controllably such that sufficient electrocatalytic activity is imposed on the material, but not at the expense of losing all the favourable properties of the BDD. It is also important that the route to fabrication is reproducible between sensor to sensor. Introducing sp2 carbon during the BDD growth process (by changing concentrations of carbon to hydrogen in the gas phase) is not appropriate as it offers no control over the placement of the sp2 carbon, just an increase in the average sp2 surface concentration. Moreover the sp2 surface content is likely to vary heterogeneously over the surface of the grown wafer of BDD. Furthermore, it should be noted that using sp2 only carbon materials (such as graphene, carbon nanotubes, glassy carbon) for sensing also has its drawbacks.

As described in WO2013/135783, a very high grade of BDD in wafer form has been developed which contains minimal sp2 carbon content and is therefore an ideal starting material for any work where sp2 carbon needs to be deliberately added to the surface. Furthermore, it has been found that laser ablation of sp3 pure BDD (e.g. using a nanosecond pulsed laser) introduces sp2 carbon sites into the diamond surface. The BDD is ablated from the surface into the gas phase. However not all the material is converted to gaseous products such as $CO_2$ and upon cooling outside the laser plume the ablated material condenses onto the walls of the pit in the diamond cut by the laser. The material left behind is exceptionally stable, remaining even after a compulsory hot acid treatment at 200° C. to remove loosely attached carbon, but importantly consists predominantly of sp2 carbon. The carbon is in a highly oxidised form and contains quinone-like moieties (QLMs) which are directly integrated into the surface of the material. In model buffer solutions these QLMs undergo proton coupled electron transfer and show a well-defined, linear, Nernstian (59 mV shift in the peak potential per pH unit) response across the pH range 2-12 under room temperature conditions, over a potential range −0.4 V to 0.4 V.

FIG. 1 illustrates an sp2 functionalized boron doped diamond electrode fabricated via laser patterning as described in WO2016/083263 for performing pH measurements. The functionality of such an electrode can be varied by varying the geometry of the laser pits (diameter and depth) and the distribution of laser pits over the surface of the BDD electrode such that the electrode can function more like an sp2 carbon electrode (lots of large pits) or more like a pure BDD electrode (fewer, smaller pits). Variations in sp2 functionality can be achieved by control of the power of the laser during machining/ablation of the surface.

For example, laser pit size and/or spacing can be altered to control the position of the oxygen redox peak and thus control the separation of the oxygen and pH redox peaks to avoid interference. Furthermore, laser pit size and/or spacing can be altered to control how much the sensor readings are affected by the measurement environment such as flow conditions, e.g. to provide an oxygen redox signal which is independent of blood flow rate. Further still, laser pit size and/or spacing can be optimized for different applications, e.g. transport of species in a tissue matrix is slow and thus the sensor configuration can be optimized for such transport conditions in tissue insertion applications.

Furthermore, for some applications miniaturising the sensor will be important and it may be necessary to use smaller pattern sizes than achievable using the current laser ablation approach. In this regard, alternative electrode milling techniques may be used such as focused ion beam milling for miniaturised sp2 creation.

Pure BDD is electrocatalytically inactive to the oxygen reduction reaction (ORR). However, it is known that sp2 incorporation into the surface produces sites which are capable of ORR (albeit kinetically limited). sp2 carbon electrodes are known to electrochemically reduce oxygen via a two electron transfer mechanism, i.e. $O_2+2H^++2e^- \rightarrow H_2O_2$, resulting in hydrogen peroxide, $H_2O_2$, production. Therefore changes in $O_2$ concentration are reflected in the current magnitude (recorded either via chronoamperometry or cyclic voltammetry or variants thereof). The position of the ORR wave on the potential axis with respect to $E_o$, will be influenced by both the electron transfer kinetics, $k_o$, (for the surface of interest, as ORR is an electrocatalytic process) and mass transport in the system. Furthermore, ORR is also pH dependent. It has been found that using an sp2 functionalized BDD electrode the position of the ORR response is significantly shifted with respect to that of the pH response enabling both analytes to be analytically detected using the same sensor. For ORR in-vivo studies where the sensor will be subject to significant blood flow, which can vary, it is important that the sensor is again flow rate independent. This is possible by producing graphitic microarrays where the diffusional flux is higher than that from convective effects.

The use of standard reference electrodes such an Ag/AgCl reference electrode or a saturated calomel electrode is not preferred for direct internal contact due to: (i) size and fragility issues, a glass electrode cannot be placed directly into the human body, they are typically too large; and (ii) even if the electrode can be reduced down in size using e.g. microfabrication techniques to make AgCl coated Ag devices, the AgCl is considered a toxic material for direct contact with human blood or tissue in-vivo and is likely to be subject to drift. Reference electrode drift will lead to erroneous readings in sample pH and oxygen content, which for biomedical applications can be extremely harmful. Hence an alternative approach is required. One approach that has been adopted in the literature is to place an electroactive reference molecule on the surface of the electrode using chemical derivatisation approaches, and use the potential difference signal (between this molecule and the analyte of interest) to combat any drift issues associated with the reference. Unfortunately this approach cannot be employed here as any suitable chemical grafted to the surface of the sensor is likely to be considered a toxic entity for in-vivo studies and/or is likely to degrade off the surface of the sensor in use. In contrast, the present sensor uses the potential difference signal between the ORR and pH response. The ORR and pH response show a different mV/pH unit shift with changing pH thus allowing sample pH and oxygen concentration to be determined using the same conducting diamond sensor.

Figure 2:
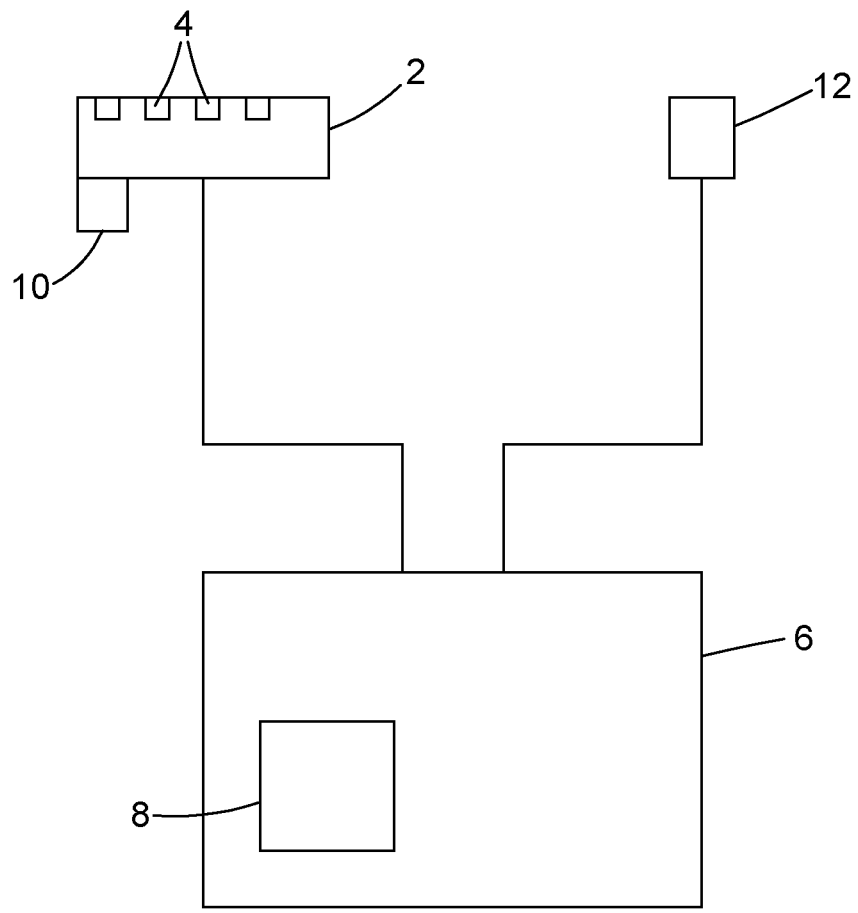
FIG. 2 shows the basic components of an electrochemical sensor comprising an sp2 functionalized boron doped diamond electrode according to an embodiment of the present invention.

FIG. 2 shows the basic components of an electrochemical sensor comprising an sp2 functionalized boron doped diamond electrode according to an embodiment of the present invention. The electrochemical sensor comprises a boron doped diamond electrode 2 formed of boron doped diamond material. An array of non-diamond carbon sites 4 is disposed on a sensing surface of the boron doped diamond electrode. Electrochemically active non-diamond carbon surface groups are bonded to the non-diamond carbon sites for generating a first redox peak at a first potential associated with dissolved oxygen and a second redox peak at a second potential which changes with pH, the first and second redox peaks being separated such that they do not overlap. An electrical controller 6 is configured to scan the boron doped diamond electrode over a potential range to generate at least said first redox peak. A processor 8 is configured to give an electrochemical reading based on one or both of a position and an intensity of said first redox peak. The processor can be configured to give a dissolved oxygen concentration reading based on the intensity of the first redox peak. Additionally or alternatively, the electrical controller can be configured to scan the boron doped diamond electrode over a potential range to generate both the first and second redox peaks and the processor is configured to give a pH reading based on a difference in potential between the first and second redox peaks, the first redox peak associated with dissolved oxygen functioning as an internal reference such that pH is determined without requiring a standard reference electrode. The embodiment illustrated in FIG. 2 also comprises a temperature sensor 10 mounted to the boron doped diamond electrode and a counter/reference electrode 12. It should be noted that the counter/reference electrode may be formed by a component of the device to which the sensor is mounted.

Figure 3:
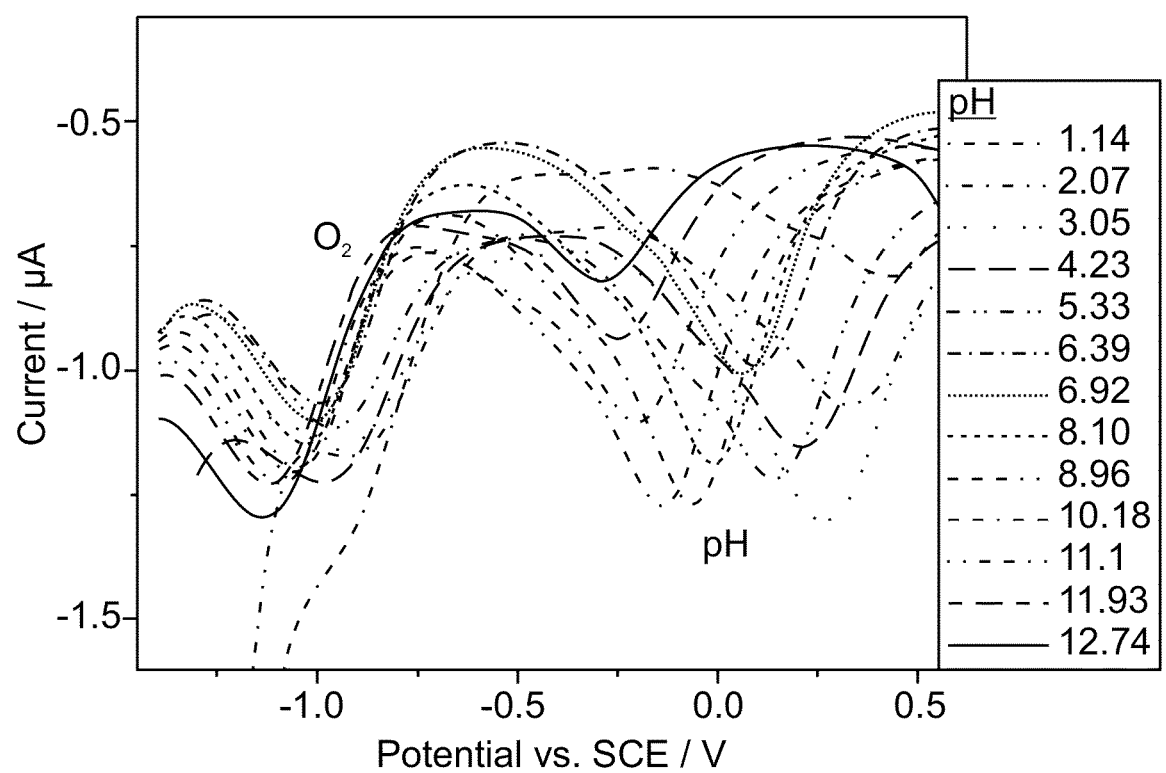
FIG. 3 shows square wave voltammetry results using the sensor of the present invention showing redox peaks for both pH and oxygen.
Figure 4:
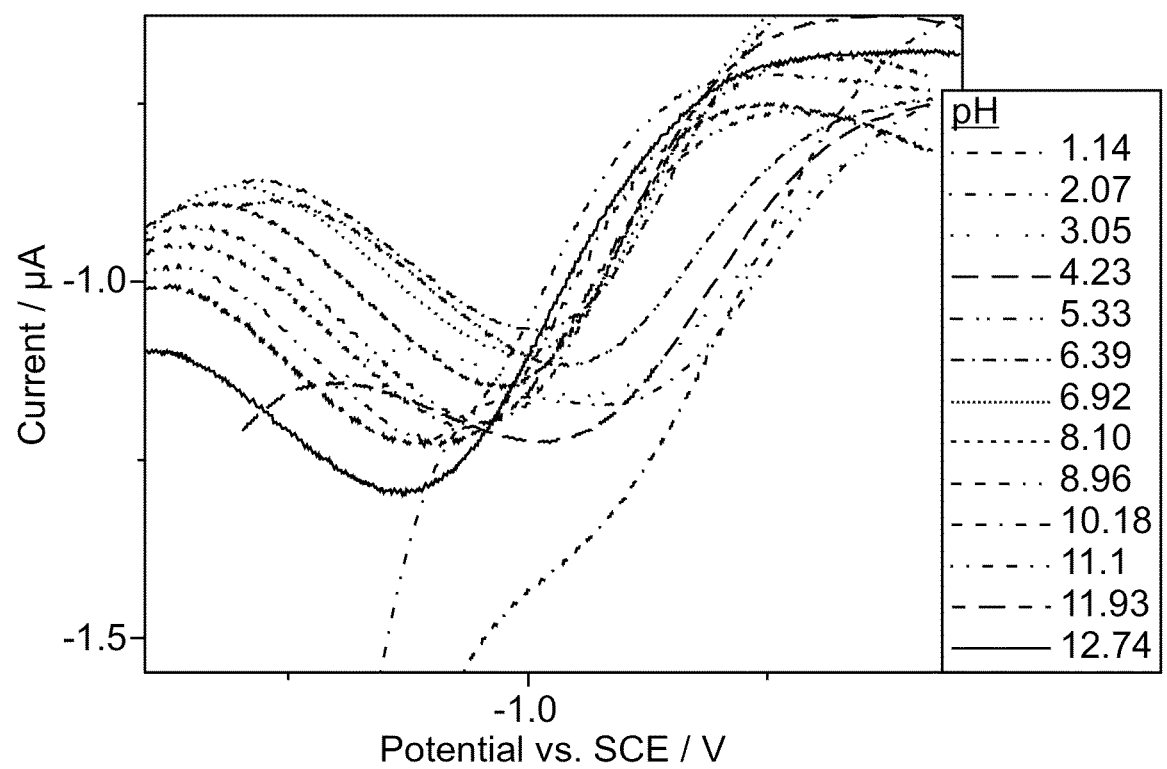
FIG. 4 shows oxygen redox peaks in more detail with varying pH.
Figure 5:
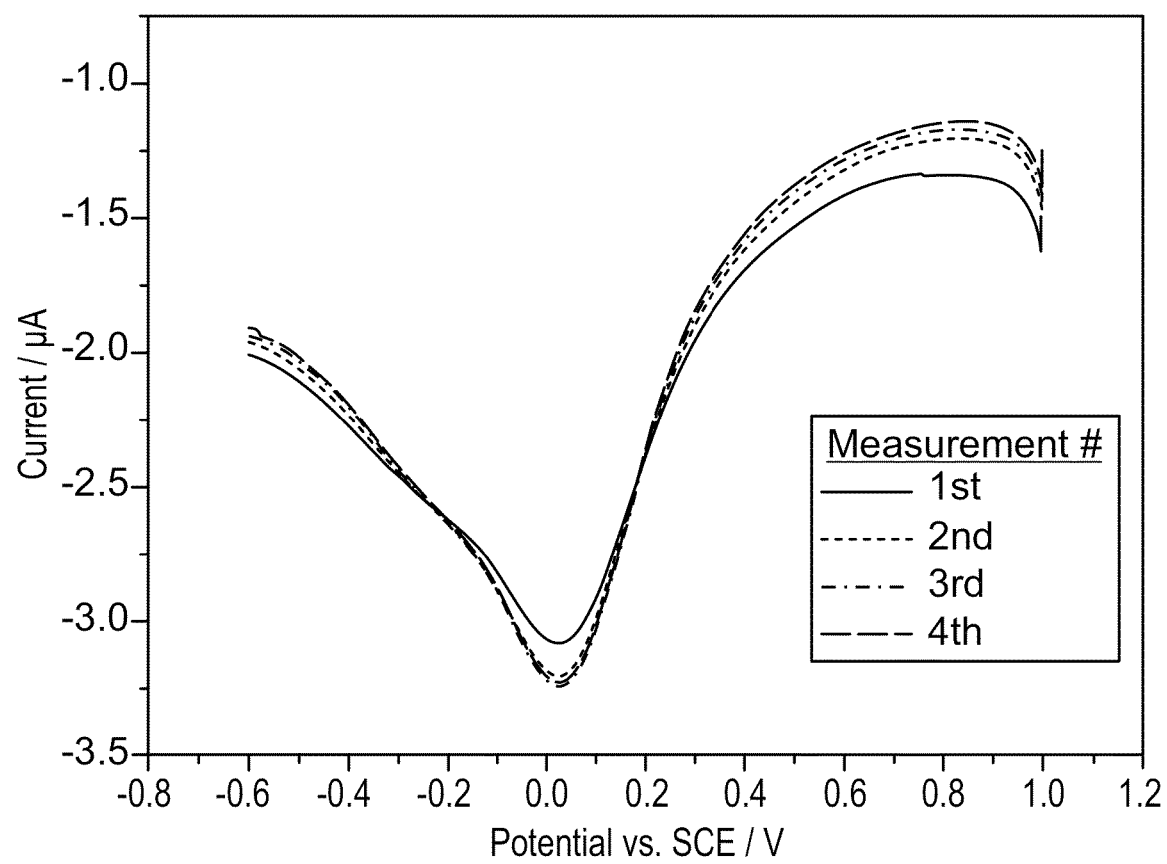
FIG. 5 shows pH redox peaks in more detail for pH measurements made in lamb's blood indicting good repeatability in a blood matrix environment.

FIG. 3 shows square wave voltammetry results using the sensor of the present invention showing redox peaks for both pH and oxygen at various pH values. The sp2 functionalized BDD electrode generates two distinct peaks which do not interfere. FIG. 4 shows oxygen redox peaks in more detail with varying pH. Furthermore, FIG. 5 shows pH redox peaks in more detail for pH measurements made in lamb's blood indicting good repeatability in a blood matrix environment.

Figure 6A:
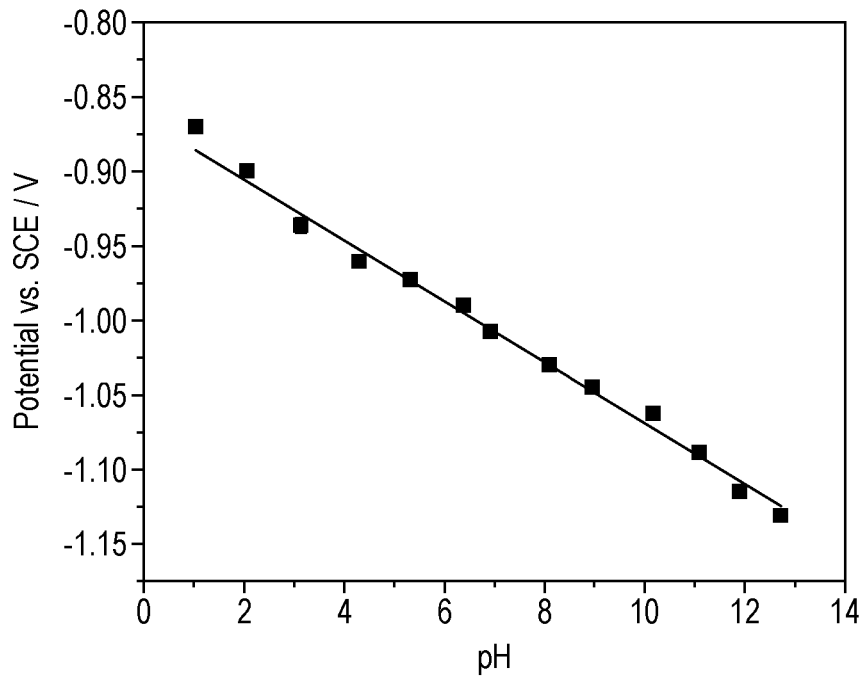
FIG. 6 shows calibration graphs of potential versus pH for the oxygen redox peak (a) and pH redox peak (b)
Figure 6B:
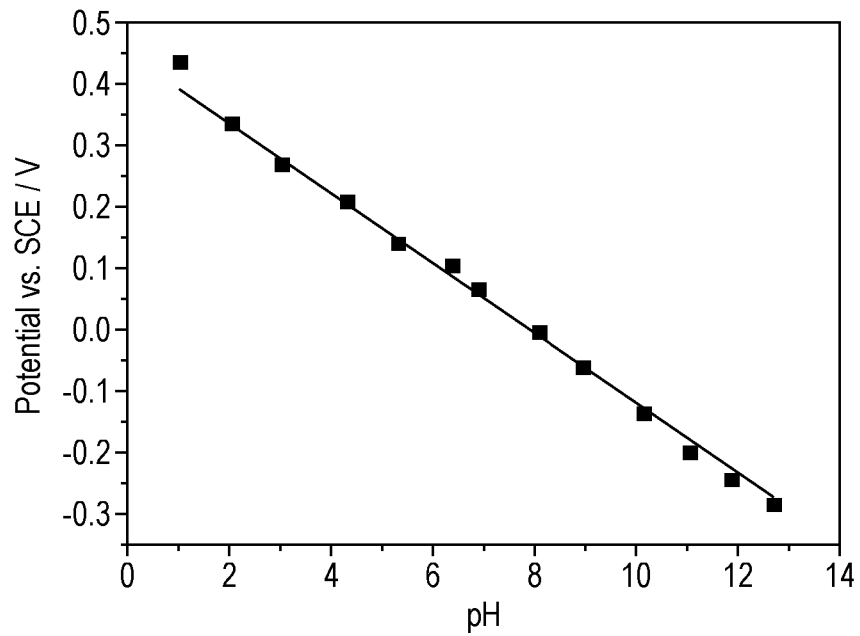
Figure 7:
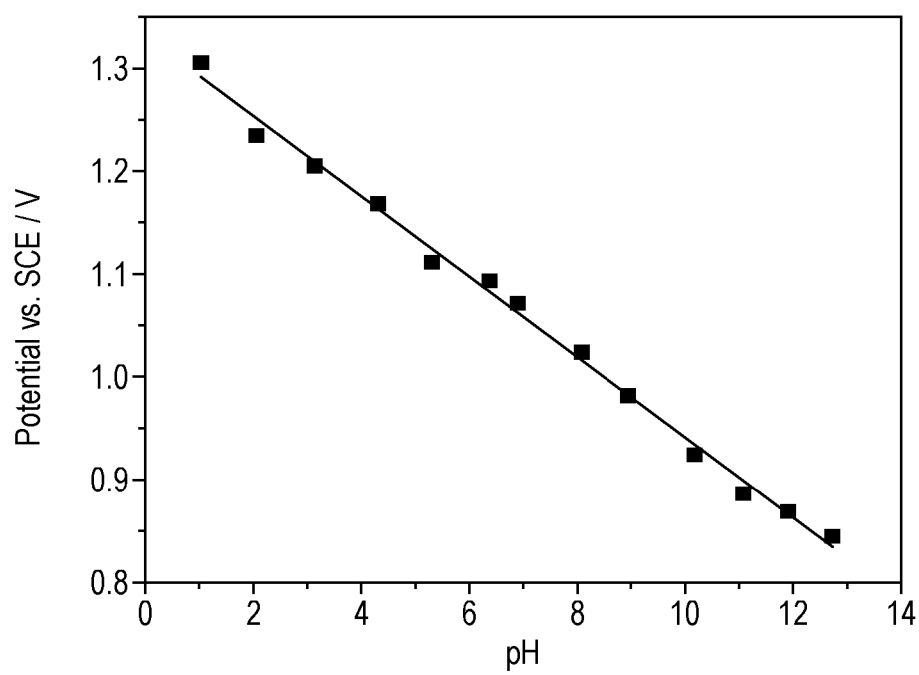
FIG. 7 shows a calibration graph of the potential difference between the oxygen redox peak and pH redox peak versus pH.

FIG. 6 shows calibration graphs of potential versus pH for the oxygen redox peak (a) and pH redox peak (b). The calibrations show good linearity. Furthermore, FIG. 7 shows a calibration graph of the potential difference between the oxygen redox peak and pH redox peak versus pH. Again the calibration shows good linearity. Furthermore, this potential difference measurement is more stable to electrode drift (e.g. reference electrode drift) and enables measurements to be made without requiring a standard reference electrode.

As previously described, in addition to the above described pH and $O_2$ measurements, boron doped diamond has a high thermal conductivity (700 W $m^{-1}$ $K^{-1}$). Thus placing a temperature probe on the back face of a BDD sensor device (not in contact with the solution) will provide an accurate temperature reading of the sample solution, particularly if the BDD sensor device is thin.

Another important issue is the long term stability of the electrode in challenging matrices such as blood. Non-specific adsorption events can impair the performance of a sensor. In this regard, it is possible to apply more extreme potentials to BDD (>1 V) without impairing the performance of the electrode, for long periods of time if needed. This results in cleaning of the electrode surface and is a particular advantage of BDD in this application. Note the BDD sensor is also entirely compatible with high temperature sterilisation procedures utilized for medical devices. Furthermore, BDD sensors suppress gas evolution when compared to other types of sensor which can be important, e.g. in medical applications.

To make in-vivo measurements either directly in the tissue or blood supply of the patient it is necessary to engineer packaging suitable for in-vivo placement. For in-vivo studies the reference/counter electrode can simply be biocompatible conducting diamond (BDD), the outer casing of the sensor packaging, or a portion of the device on which it is mounted. In one embodiment the BDD sensor can be integrated into a standard hypodermic needle with the needle functioning as a counter electrode. The sensor may alternatively be integrated into a catheter, scalpel, syringe body, dialysis equipment or any other medical devices.

The direct beneficiaries of the sensor technology as described herein will be patients who need diagnostics or treatment whose health can be directly evaluated based on the pH and $O_2$ content in their blood and tissues as well as temperature. For example, trauma patients when being evaluated by paramedics; cancer patients for tumour assessment; long term monitoring of patients in intensive care to ensure stability; to name just a few. Each of the groups concerns a vast amount of people, having huge social and economic impacts. A portable and wireless chemical sensor will provide real time information, allowing immediate clinical management decisions to be made thus can effectively control symptoms, reduce hospitality and fatality, and improve patient quality of life. A swallowable version of the sensor can also be provided to record pH and/or oxygen concentration down the gastrointestinal tract.

Pharmaceutical industry will also benefit from the sensor technology as described herein. Both the US Food and Drug Administration (FDA) and the European Medicines Agency (EMA) have emphasized the value and the importance of drug-concentration data obtained from human tissue, and the support on the use of clinical microdialysis to obtain this information during drug development and for new drug submissions. The sensor is especially useful in the study of bioavailability and bioequivalence of topically administered drugs and drug efficacy. The sensor can also be used as an analytical tool in pre-selection of appropriate drug candidates before costly and lengthy clinical trials, or in the optimization of drug administrations. Further still, the sensor can be used to build pharmacokinetic models indicating the time course of drug absorption, distribution, metabolism, and excretion.

A third group of beneficiaries are academic researchers in the wide range of research fields including medicine, environmental, pharmaceutical and biomolecular as well as other areas. As the present sensor can be miniaturising when compared with traditional bulky lab based systems it has a smaller footprint and can be carried freely by patient or volunteers, to provide higher time resolution, and sensitive chemical analysis.

While this invention has been particularly shown and described with reference to embodiments, it will be understood to those skilled in the art that various changes in form and detail may be made without departing from the scope of the invention as defined by the appending claims. For example, while the above described embodiments largely focus on medical applications it will be appreciated that the advantageous features of the sensor technology as described herein are also applicable in a wide range of industrial and environmental electrochemical sensing applications where monitoring of pH, dissolved oxygen concentration, and temperature are important.

The invention claimed is:

1. An electrochemical sensor comprising:
a boron doped diamond electrode formed of boron doped diamond material;
a two-dimensional array of non-diamond carbon sites disposed across a sensing surface of the boron doped diamond electrode;
electrochemically active non-diamond carbon surface groups bonded to the non-diamond carbon sites;
an electrical controller; and
a processor;
wherein the electrical controller and the processor are configured to:
scan the boron doped diamond electrode over a potential range to generate at least a first redox peak by the electrochemically active non-diamond carbon surface groups bonded to the non-diamond carbon sites;
measure the first redox peak at a first potential associated with dissolved oxygen;
measure a second redox peak at a second potential which changes with pH, the second redox peak being generated by the electrochemically active non-diamond carbon surface groups bonded to the non-diamond carbon sites and the first and second redox peaks being separated such that the first and second redox peaks do not overlap; and
provide an electrochemical reading based on one or both of a position of the first redox peak relative to the second redox peak, and an intensity of said first redox peak.

2. The electrochemical sensor according to claim 1, wherein the processor is configured to provide a dissolved oxygen concentration reading based on the intensity of the first redox peak.

3. The electrochemical sensor according to claim 1, wherein the electrical controller is configured to scan the boron doped diamond electrode over the potential range to generate both the first and second redox peaks, and wherein the processor is configured to give a pH reading based on a difference in potential between the first and second redox peaks, the first redox peak associated with the dissolved oxygen functioning as an internal reference such that the pH is determined without requiring a standard reference electrode.

4. The electrochemical sensor according to claim 1, further comprising a temperature sensor mounted to the boron doped diamond electrode.

5. The electrochemical sensor according to claim 1, wherein the boron doped diamond electrode is mounted on a medical device.

6. The electrochemical sensor according to claim 5, wherein the medical device is an invasive device which, in whole or in part, penetrates inside a human or animal body, either through a body orifice or through the surface of the body, and the boron doped diamond electrode is mounted on the invasive device such that in use the boron doped diamond electrode is located within the body to take in vivo electrochemical readings.

7. The electrochemical sensor according to claim 6, wherein the invasive device comprises a metallic component which is connected to the electrical controller and functions as any of a counter and a pseudo reference electrode.

8. A method of measuring characteristics of a fluid from a human or animal body, comprising obtaining the fluid, passing it over the boron doped diamond electrode of the electrochemical sensor according to claim 1, and obtaining an electrochemical reading.

9. The method according to claim 8, wherein the characteristics are selected from any of: pH; oxygen concentration; and temperature.

* * * * *